(12) United States Patent
Bernstein et al.

(10) Patent No.: US 6,509,725 B1
(45) Date of Patent: Jan. 21, 2003

(54) SELF-REGULATING VOLTAGE DIVIDER FOR SERIES-STACKED VOLTAGE RAILS

(75) Inventors: Kerry Bernstein, Underhill, VT (US); Peter Edwin Cottrell, Essex Junction, VT (US); Roger Paul Gregor, Endicott, NY (US); Stephen V. Kosonocky, Wilton, CT (US); Edward Joseph Nowak, Essex Junction, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/683,025

(22) Filed: Nov. 9, 2001

(51) Int. Cl.⁷ .................................................. G05F 3/04
(52) U.S. Cl. ...................................................... 323/312
(58) Field of Search ................................ 323/312, 313; 363/62; 327/535, 538, 539, 540, 543

(56) References Cited

U.S. PATENT DOCUMENTS

| | | |
|---|---|---|
| 5,440,249 A | 8/1995 | Schucker et al. |
| 5,764,082 A | 6/1998 | Taylor |
| 5,848,101 A | 12/1998 | Taylor |
| 5,850,153 A | 12/1998 | Harris et al. |
| 5,862,390 A | 1/1999 | Ranjan |
| 5,959,372 A | 9/1999 | Every |
| 5,963,057 A | 10/1999 | Schmitt et al. |
| 6,031,394 A | 2/2000 | Cranford et al. |
| 6,087,852 A | 7/2000 | Briggs et al. |
| 6,229,348 B1 * | 5/2001 | Matsumoto ............... 327/67 |
| 6,335,651 B1 * | 1/2002 | Fayyaz ................... 327/359 |

FOREIGN PATENT DOCUMENTS

JP 58-039371 3/1983

\* cited by examiner

*Primary Examiner*—Matthew Nguyen
(74) *Attorney, Agent, or Firm*—Richard A. Henkler; Bracewell & Patterson, L.L.P.

(57) ABSTRACT

A system and method for achieving self-regulated voltage division among multiple serially stacked voltage planes. The system of the present invention is incorporated within a source voltage plane having a source supply node for supplying current and a source ground node for sinking current supplied therefrom. An intermediate voltage supply node is coupled between the source supply voltage node and the source ground node for dividing the source voltage plane into a plurality of intermediate voltage planes. The self-regulated voltage divider of the present invention includes a first capacitor and a second capacitor that are each controllably coupled between either the source supply voltage node and the intermediate voltage supply node, or between the intermediate voltage supply node and the source ground node, such that a voltage level balance is achieved among the intermediate voltage planes.

14 Claims, 11 Drawing Sheets

SELF-REGULATING VOLTAGE DIVIDER FOR SERIES-STACKED VOLTAGE RAILS

BACKGROUND OF THE INVENTION

1. Technical Field

The present invention relates in general to power distribution within an integrated circuit (IC) chip, and in particular to an apparatus and method for improving DC distribution efficiency for IC applications. More particularly, the present invention relates to an on-chip, multi-plane voltage distribution system that incorporates a self-regulating voltage divider for efficiently scaling external power boundaries.

2. Description of the Related Art

With switching thresholds in the tenths of a volt region for sub-micron IC devices, the trend in power supply technology is toward lower supply voltage levels. In addition to reducing power consumption, operation at lower voltages also reduces electric field across internal device nodes, resulting in more reliable operation of devices having sub-micron physical dimensions. To achieve such benefits, application board supply voltages as low as 1.2 volts DC are becoming commonplace. While reducing on-chip power consumption, however, such low supply voltages are achieved at a substantial cost in power supply overhead hardware that is required for additional DC-to-DC conversion stages. In addition, the electrical efficiency of low output voltage power supplies suffers due to the power consumption of the regulation and DC-to-DC conversion circuitry.

Most power supplies are required to support a variety of data processing system requirements in addition to those of internal microcircuits. For a personal computer, such additional requirements may include, for example, the power supply fan, magnetic and optical disk drivers, and input/output (I/O) bus support. Power supplies for larger scale data processing systems may be required to support multiple disk arrays, telecommunication infrastructure, and the like. The vast disparity between the voltage levels required for these applications and the IC chip voltage levels further increases power supply overhead hardware requirements and reduces power supply efficiency.

AC source power supplies operate more efficiently at higher voltages as both a consequence of having fewer voltage level conversion stages and lower current losses. For batteries, fundamental physical reactions typically result in output voltages in the range of 1V to 3V based on chemical compositions.

To meet disparate power supply requirements from applications that demand high power density, low power consumption, and high efficiency, power supplies for high-level data processing systems, such as network servers, must often be custom designed. Significant development time and resources are required to support such customization for systems having individualized power requirements. Since the design and construction of a custom power supply presumably overlaps the design phase of the data processing system, supply capacity requirements may have to be adjusted, resulting in an overall delay in product development.

From the foregoing, it can be appreciated that a need exists for an on-chip DC power distribution system that will provide relief for the low-voltage conversion requirements of multi-purpose power supplies.

BRIEF SUMMARY OF THE INVENTION

A system and method for achieving self-regulated voltage division among multiple serially stacked voltage planes are disclosed herein. The system of the present invention is incorporated within a source voltage plane having a source supply node for supplying power and a source ground node for sinking current supplied therefrom. An intermediate voltage supply node is coupled between the source supply voltage node and the source ground node for dividing the source voltage plane into a plurality of intermediate voltage planes. The self-regulated voltage divider of the present invention includes a first capacitor and a second capacitor that are each controllably coupled between either the source supply voltage node and the intermediate voltage supply node, or between the intermediate voltage supply node and the source ground node, such that a voltage level balance is achieved among the intermediate voltage planes.

All objects, features, and advantages of the present invention will become apparent in the following detailed written description.

BRIEF DESCRIPTION OF THE SEVERAL VIEWS OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF THE INVENTION

Detailed Description of the Preferred Embodiment

Figure 1A:
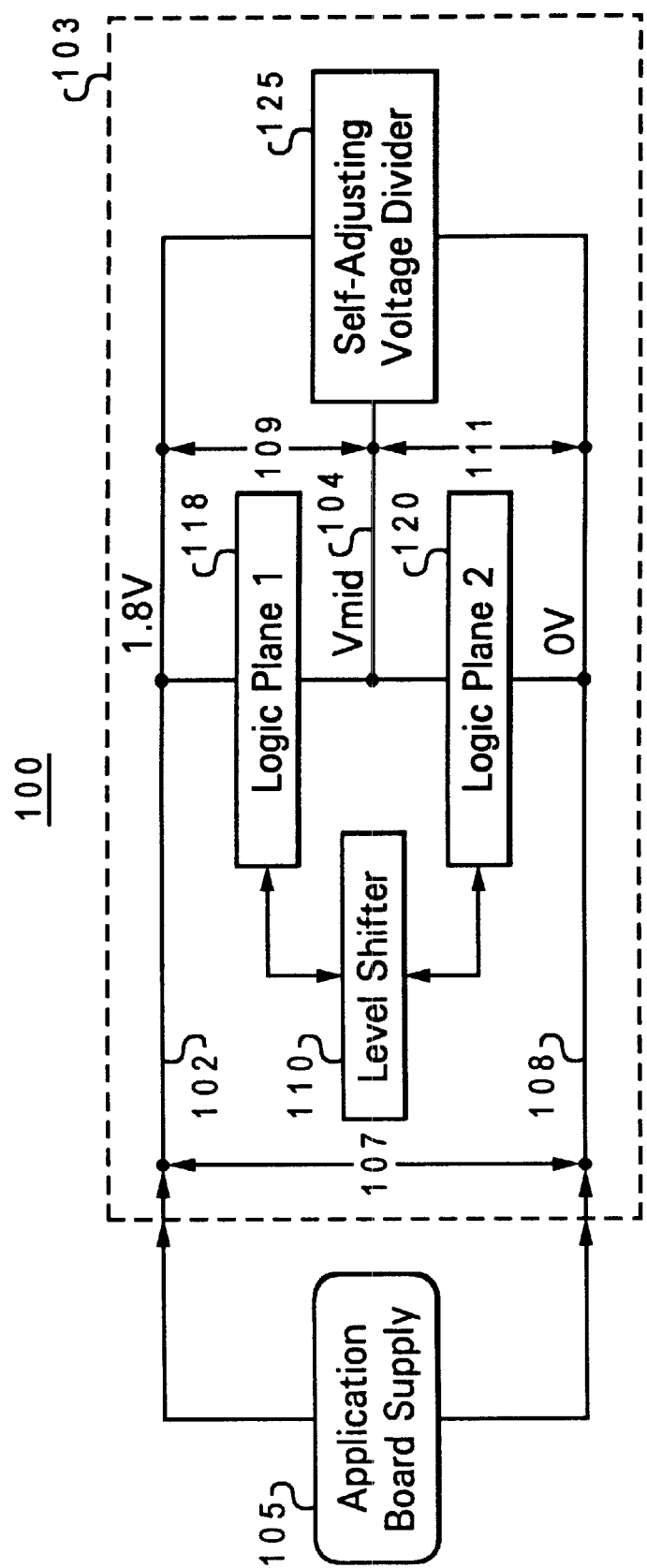
FIG. 1A is a block diagram depicting a DC distribution system, in accordance with a preferred embodiment of the present invention.

This invention is described in a preferred embodiment in the following description with reference to the figures.

While this invention is described in terms of the best mode for achieving this invention's objectives, it will be appreciated by those skilled in the art that variations may be accomplished in view of these teachings without deviating from the spirit or scope of the present invention.

With reference now to the figures, and in particular with reference to FIG. 1, there is illustrated a block diagram depicting a DC distribution system 100 in accordance with a preferred embodiment of the present invention. DC distribution system 100 includes a source voltage plane 107 comprising a source supply rail 102 that provides a conductive medium for supplying a 1.8 VDC source to an IC chip 103 from an application board power supply 105. Source voltage plane 107 is terminated by a source ground rail 108 which sinks current supplied from application board power supply 105.

As further depicted in FIG. 1, DC distribution system 100 further includes an intermediate ground rail 104 that, in accordance with the teachings of the present invention, divides source voltage plane 107 into two series-connected intermediate voltage planes 109 and 111. In the depicted embodiment, the 1.8 VDC source voltage supplied from source supply rail 102 is ideally divided in identical 0.9 VDC increments across each of intermediate voltage planes 109 and 111. To implement such a voltage division in an accurate and efficient manner, DC distribution system 100 employs a self-regulating voltage divider 125 the detail of which are explained with reference to the remaining figures.

The 0.9 VDC dropped across each of intermediate voltage planes 109 and 111 provides the required DC voltage levels for multiple circuit blocks 118 and 120 within IC chip 103. A central feature of the distribution system depicted in FIG. 1A is that intermediate voltage planes 109 and 111 are interdependently regulated to form a mutually dependent voltage stack having two "floors" and two "ceilings." Within the stack, intermediate voltage planes 109 and 111 are connected in series. Source supply rail 102 serves as the top ceiling for intermediate voltage plane 109, while source ground rail 108 is the bottom floor for intermediate voltage plane 111. Intermediate ground rail 104 serves as both the floor for voltage planes 109, and as the ceiling for subsequent voltage plane 111.

Figure 1B:
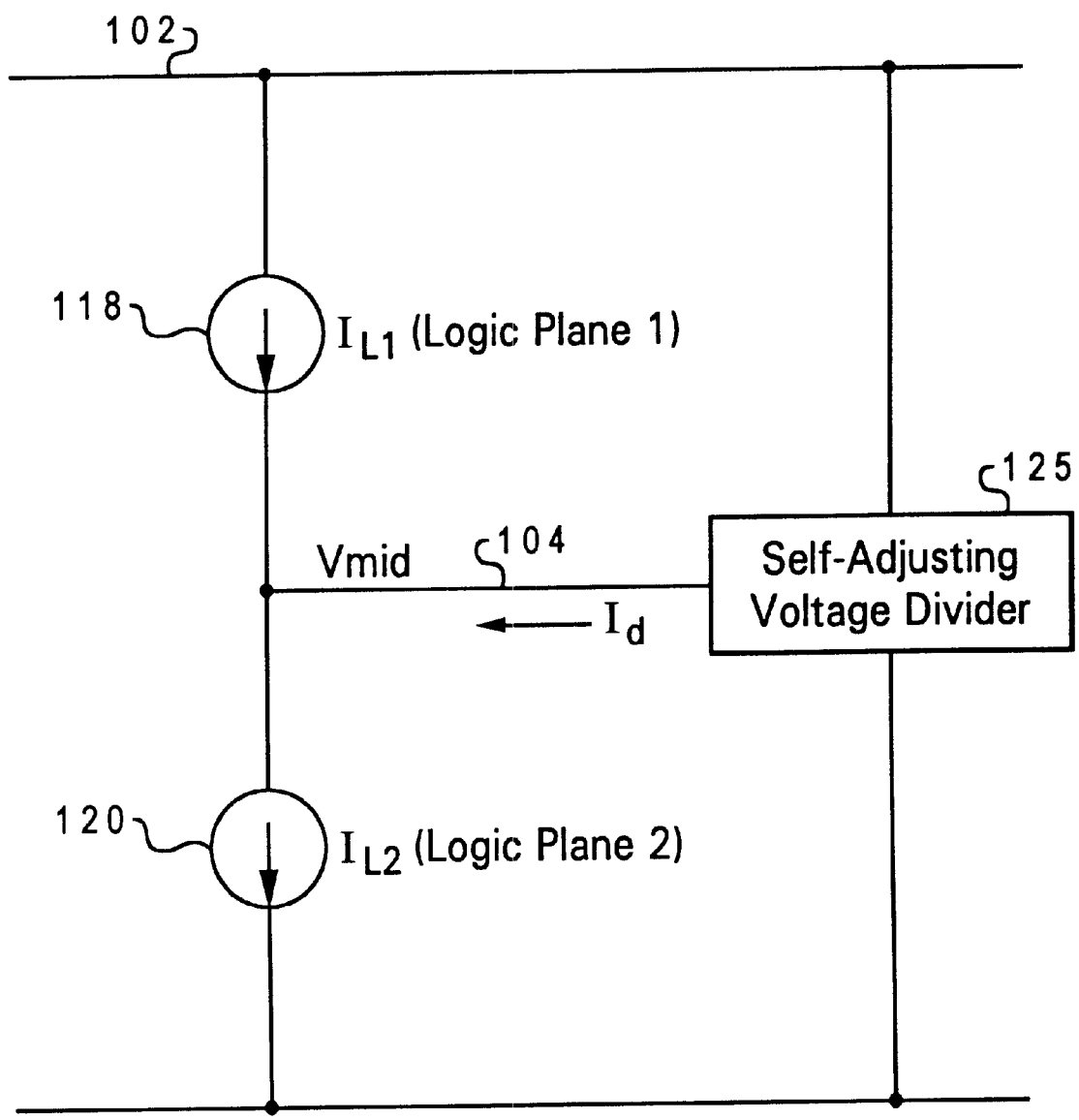
FIG. 1B illustrates a simplified model of the DC distribution system described in FIG. 1A.

Referring now to FIG. 1B, there is depicted a simplified model of the system described in FIG. 1A. As shown in FIG. 1B, logic plane 118 is represented as a current source $I_{L1}$ which represents the load current of logic plane 118. Similarly, logic plane 120 is represented in FIG. 1B as a current source $I_{L2}$. Ideally, if the load currents $I_{L1}$ and $I_{L2}$ are exactly balanced, then the intermediate voltage $V_{mid}$ at intermediate ground rail 104 would be exactly one-half of the supply voltage provided on source supply rail 102. This type of DC-to-DC conversion would theoretically provide 100% efficiency, since all the current in the system is dropped across devices used in active computations and not within DC-to-DC conversion blocks. Given the impracticality of maintaining exactly equal load currents $I_{L1}$ and $I_{L2}$ self-adjusting voltage divider 125 provides a difference current $I_d=I_{L1}-I_{L2}$, which stabilizes intermediate voltage $V_{mid}$ at one-half the supply voltage at intermediate ground rail 104. Since the current requirements for $I_d$ are much smaller than would be required to supply either $I_{L1}$ or $I_{L2}$ separately in a conventional system, the current compensation of self-adjusting voltage divider 125 can be greatly reduced by using smaller sized components such as C1, C2, P4, N2, P3, and N6 depicted in FIG. 2.

In the depicted embodiment, DC distribution system 100 scales the incoming source 1.8 VDC into ranges of 1.8 VDC–0.9 VDC and 0.9 VDC–0 VDC for intermediate voltage planes 109 and 111, respectively. Such on-chip scaling relieves application board power supply 105 from the low-voltage DC conversion that would otherwise be required to supply circuit blocks 118 and 120. It should be noted that although DC distribution system 100 is depicted as having uniform 0.9 VDC planes, alternate embodiments may have different intra-plane voltage levels and/or may have non-uniform inter-plane levels as required by the application.

As further illustrated in FIG. 1A, self-regulating voltage divider 125 is coupled to and receives voltage inputs from source supply rail 102, source ground rail 108, and intermediate voltage rail 104. As explained in greater detail with reference to FIG. 2, self-regulating voltage divider 125 is designed to increase overall power distribution efficiency within DC distribution system 100 by minimizing the power utilized for regulatory purposes. Self-regulating voltage divider 125 employs a switched capacitor technique to maintain a balanced voltage division between intermediate voltage planes 109 and 111.

A level shifter 110 is further included within DC distribution system 100 to facilitate inter-plane communication between circuit blocks 118 and 120. As depicted in FIG. 1A, level shifter 110 receives the respective voltage levels from each of rails 102, 104, and 108. As explained in further detail with reference to FIGS. 3 and 5, level shifting latches utilize these voltage levels to provide an inter-plane signaling interface between circuits blocks 118 and 120. It should be noted that although level shifter 110 is depicted as a separate, discrete units in FIG. 1A, level shifting devices such as those shown in FIGS. 3 and 5, may be implemented in a distributed manner within the voltage planes.

Some voltage regulation or voltage division mechanism is required to maintain a balanced voltage level distribution across intermediate voltage planes 109 and 111. Conventionally, voltage regulators may be employed within each of intermediate voltage planes 109 and 111 to ensure that 0.9 VDC is dropped across each. A voltage regulator typically includes circuitry for continuously holding the intra-plane voltage to a particular design value regardless of changes in load current or input voltage.

In accordance with well-known linear voltage regulator operating principles, a voltage-controlled current source forces a fixed voltage across the regulator output terminal. Typically, such a voltage regulator employs a control circuit comprising an output sensing resistor in parallel with the regulator output. A feedback loop is used to monitor the voltage across the sense resistor and deliver this voltage level to the voltage-controlled current source which adjusts the level of current delivered through the sense resistor to hold the regulator output to the desired level. The power dissipated through the sense resistor reduces the electrical efficiency and is particularly problematic for low voltage applications.

Conventional voltage dividers, comprising precision resistive elements, also incur a power efficiency penalty that, similar to voltage regulators, is magnified in a low voltage environment. As a key feature of the present invention, self-regulating voltage divider 125 is designed to maintain balanced voltage level distribution between intermediate voltage planes 109 and 111 in a more accurate and efficient manner than can be achieved by conventional voltage dividers or voltage regulators.

Figure 2:
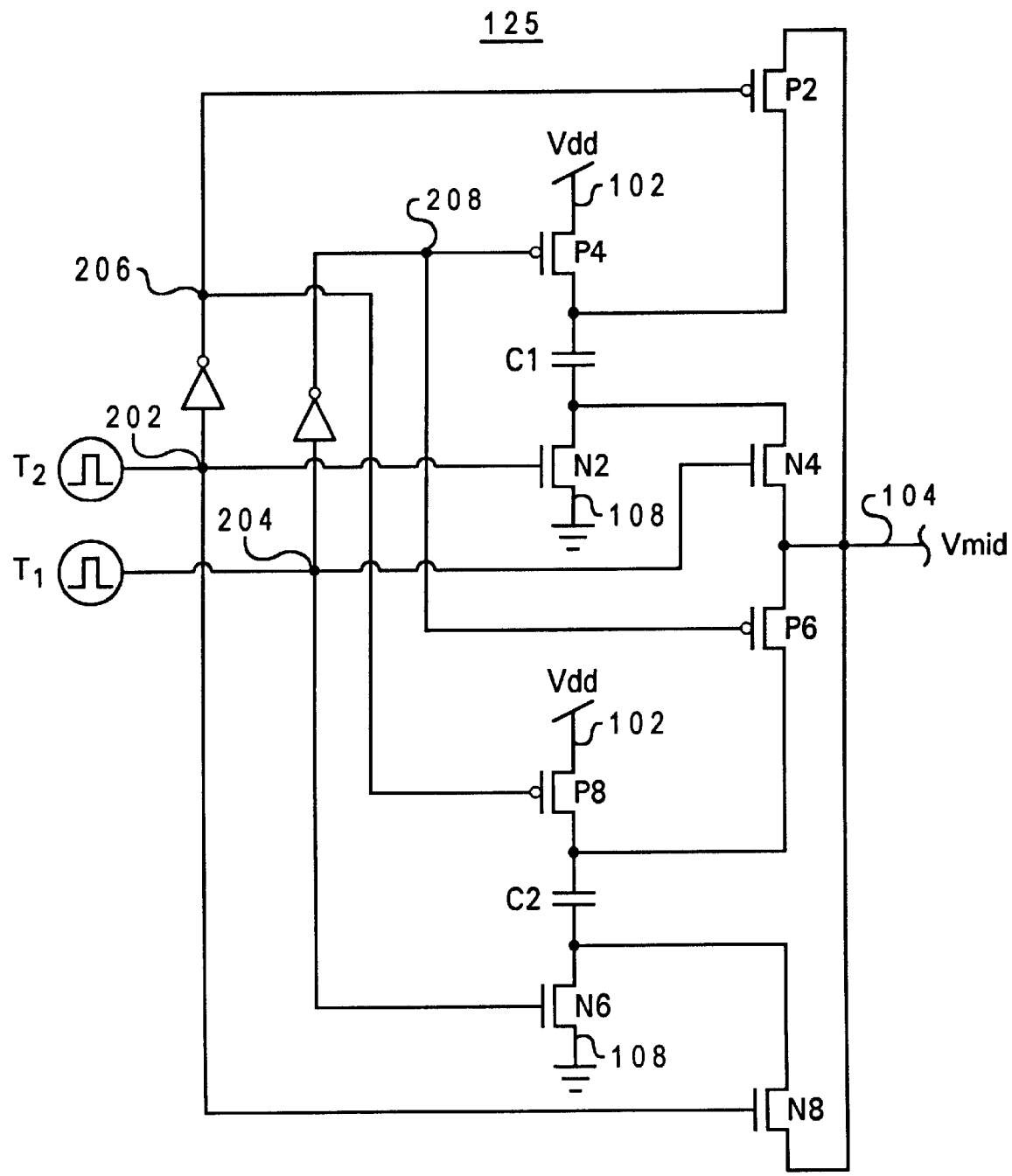
FIG. 2 depicts a self-regulating voltage divider that is employed within the DC distribution system in FIG. 1A, in accordance with a preferred embodiment of the present invention.

With reference to FIG. 2, there is depicted a circuit-level illustration of self-regulating voltage divider 125 as incorporated within DC distribution system 100 in accordance with a preferred embodiment of the present invention. As illustrated in FIG. 2, self-regulating voltage divider 125 includes a pair of capacitors C1 and C2 that are controllably coupled between either source supply node 102 and intermediate voltage node 104, or between intermediate voltage node 104 and source ground node 108.

Switching means are incorporated within self-regulating voltage divider 125 to switch the coupling of capacitors C1 and C2 in an alternating manner between the intermediate voltage planes. In accordance with a preferred embodiment, C1 and C2 are alternately switched between the intermediate voltage planes such that while C1 is coupled between source supply voltage node 102 and intermediate voltage node 104, C2 is coupled between intermediate voltage node 104 and source ground node 108. Likewise, the switching means ensures that while C2 is coupled between source supply voltage node 102 and intermediate voltage node 104, C1 is coupled between intermediate voltage node 104 and source ground node 108.

In the depicted embodiment, the switching means comprise P-type field-effect transistors (PFETs) P2, P4, P6, and P8, and N-type field-effect transistors (NFETs) N2, N4, N6, and N8. A pair of clock pulse generators T1 and T2 provide a pair of mutually out-of-phase clock pulses to a pair of control nodes 204 and 202, and a pair of inverted control nodes 208 and 206, for controlling the switching of C1 and C2.

As depicted in FIG. 2, PFET P4 is source-to-drain coupled between source supply voltage node 102 and a first plate (top) of capacitor C1. NFET N4 is source-to-drain coupled between intermediate voltage node 104 and the second plate (bottom) of C1. Thus, when P4 and N4 are switched on, capacitor C1 is electrically coupled between source supply voltage node 102 and intermediate voltage node 104 (i.e., the 1.8 VDC $V_{dd}$ is applied to the top of C1 while the 0.9 VDC $V_{mid}$ value is applied to the bottom side of C1). PFET P2 is source-to-drain connected between intermediate voltage node 104 and the top side of C1 while NFET N2 is source-to-drain connected between source ground node 108 and the bottom side of C1. Thus, when P2 and N2 are switched on, capacitor C1 is electrically coupled between intermediate voltage node 104 and source ground node 108 (i.e., the 0.9 VDC $V_{mid}$ value is applied to the top of C1 while the 0 VDC source ground value is applied to the bottom side of C1).

As further illustrated in FIG. 2, NFETs N6 and N8, and PFETs P6 and P8 are analogously configured with respect to capacitor C2 to enable selective coupling of C2 between either source supply voltage node 102 and intermediate voltage node 104, or between intermediate voltage node 104 and source ground node 108.

In accordance with the depicted embodiment, clock pulse generator T1 delivers control pulses to the gate terminals of NFETs N4 and N6, and PFETs P4 and P6 via control node 204 and inverted control node 208, respectively. Clock pulse generator T2 produces control pulses that are offset from the clock pulses generated by clock pulse generator T1, and delivers these to the gate terminals of NFETs N2 and N8, and PFETs P2 and P8 via control node 202 and inverted control node 206, respectively.

Self-regulating voltage divider 125 achieves a balanced voltage between intermediate voltage planes 109 and 111 as follows. During a period when a clock pulse from clock pulse generator T1 is asserted to a logic high and the offset clock pulse from clock pulse generator T2 is at a logic low (hereinafter referred to as a T1 phase), NFETs N4 and N6, and PFETs P4 and P6 are switched on while NFETs N2 and N8, and PFETs P2 and P8 are switched off. During a T1 phase, capacitor C1 is electrically coupled between source supply voltage node 102 and intermediate voltage node 104, while capacitor C2 is electrically coupled between intermediate voltage plane 104 and source ground plane 108. To effect a capacitor-switch transition within self-regulating voltage divider 125 from a T1 phase to the alternate T2 phase, the polarities of the control pulses from clock pulse generators T1 and T2 are reversed such that NFETs N4 and N6, and PFETs P4 and P6 are switched off while NFETs N2 and N8, and PFETs P2 and P8 are switched on. In this alternate configuration, capacitor C2 is electrically coupled between source supply voltage node 102 and intermediate voltage node 104, while capacitor C1 is electrically coupled between intermediate voltage plane 104 and source ground plane 108.

Figure 9:
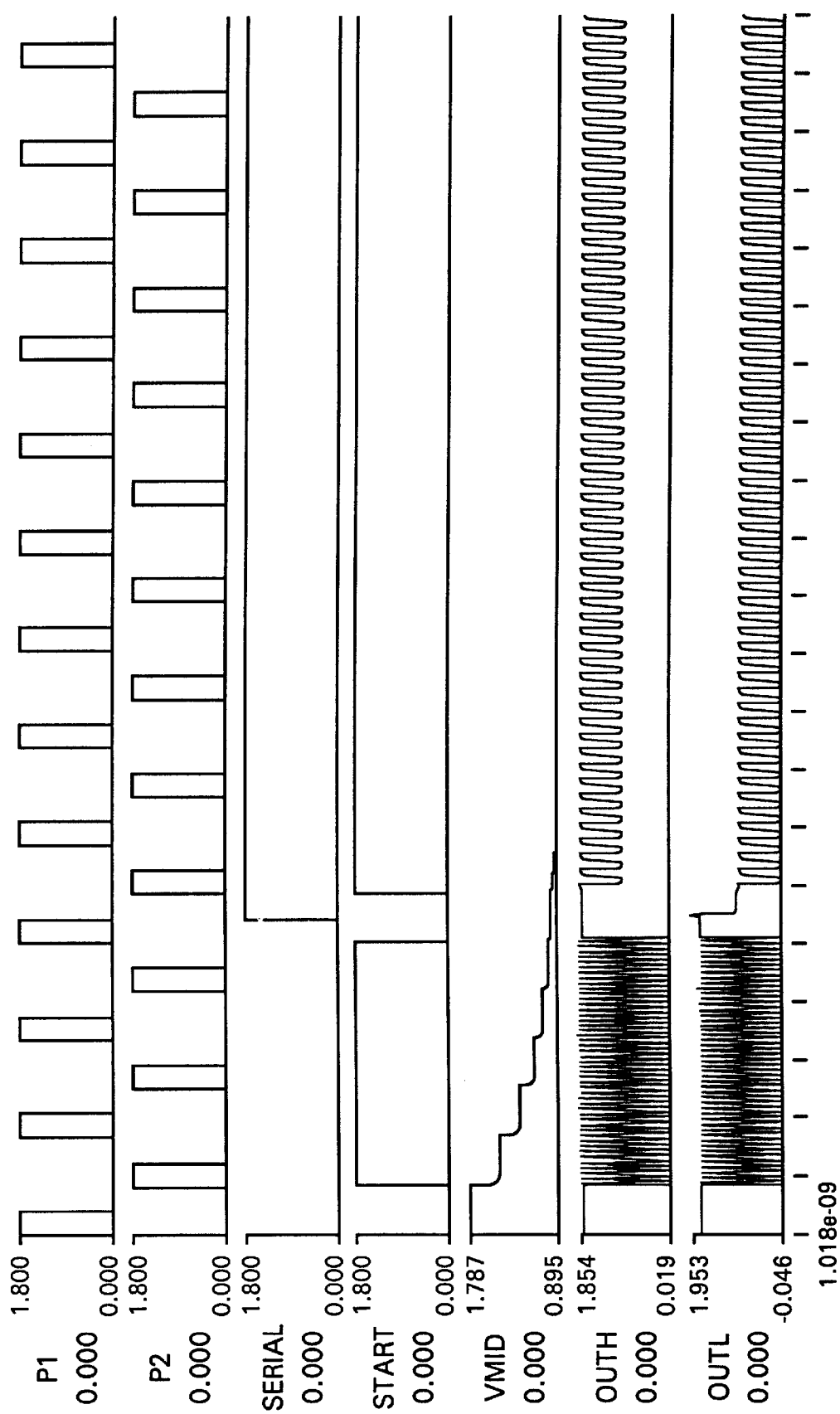
FIG. 9 illustrates an exemplary graphical representation of the voltage balance and equilibrium achieved by the self-regulating voltage divider of the present invention with respect to a pair of off-set clock pulse control signals and a resulting intermediate voltage level.

Continuous periodic train of pulses are transmitted from clock pulse generators T1 and T2 to effect a cyclic switching of capacitors C1 and C2 as described above. FIG. 9 illustrates an exemplary graphical representation of the voltage balance and equilibrium achieved by self-regulating voltage divider 125 with respect to the off-set clock pulse control signals from T1 and T2 and the resulting intermediate voltage level at intermediate voltage node 104.

Figure 3:
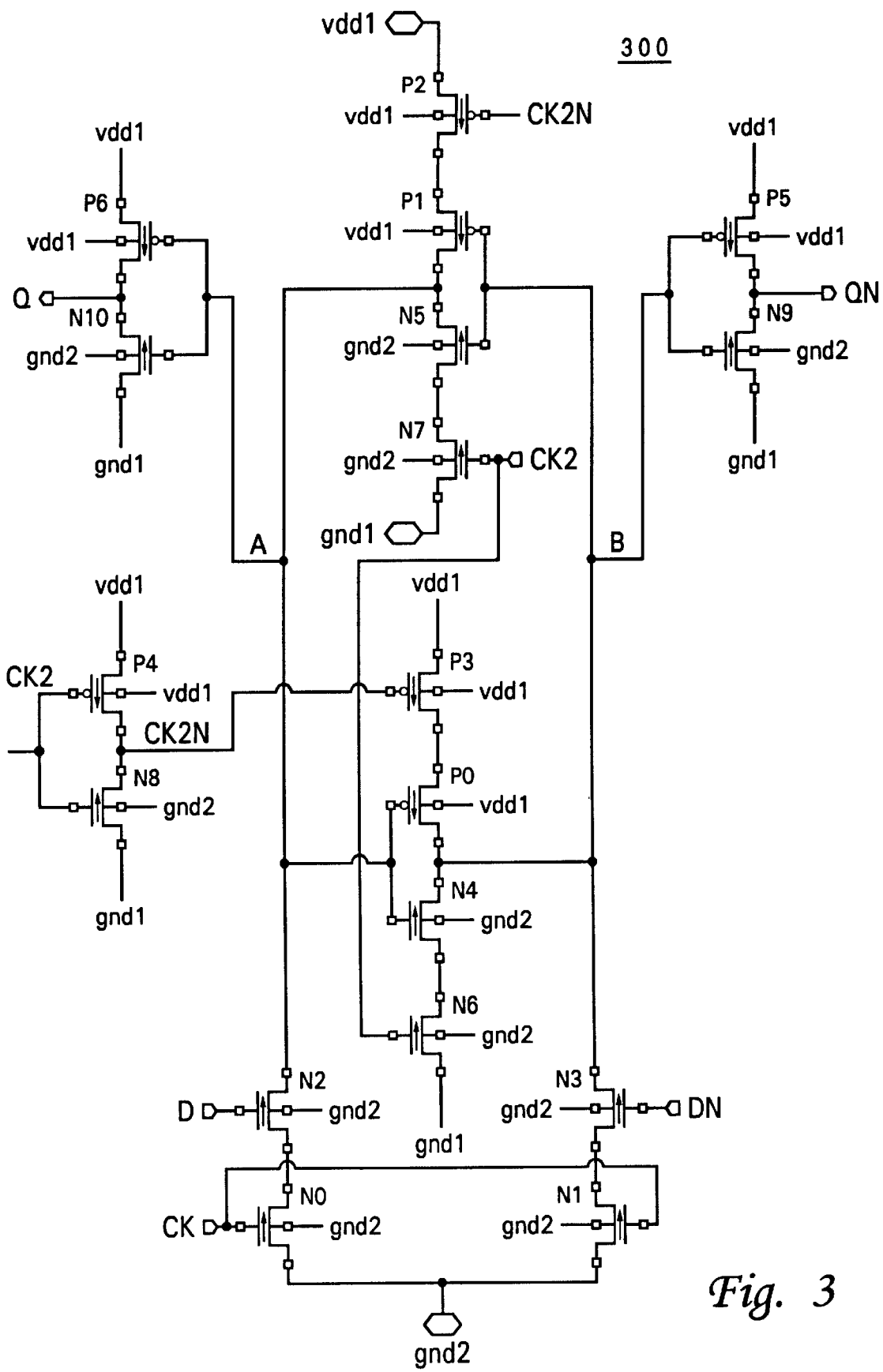
FIG. 3 illustrates a level shifting latch circuit incorporated within a self-regulating voltage divider in accordance with one embodiment of the present invention.
Figure 5:
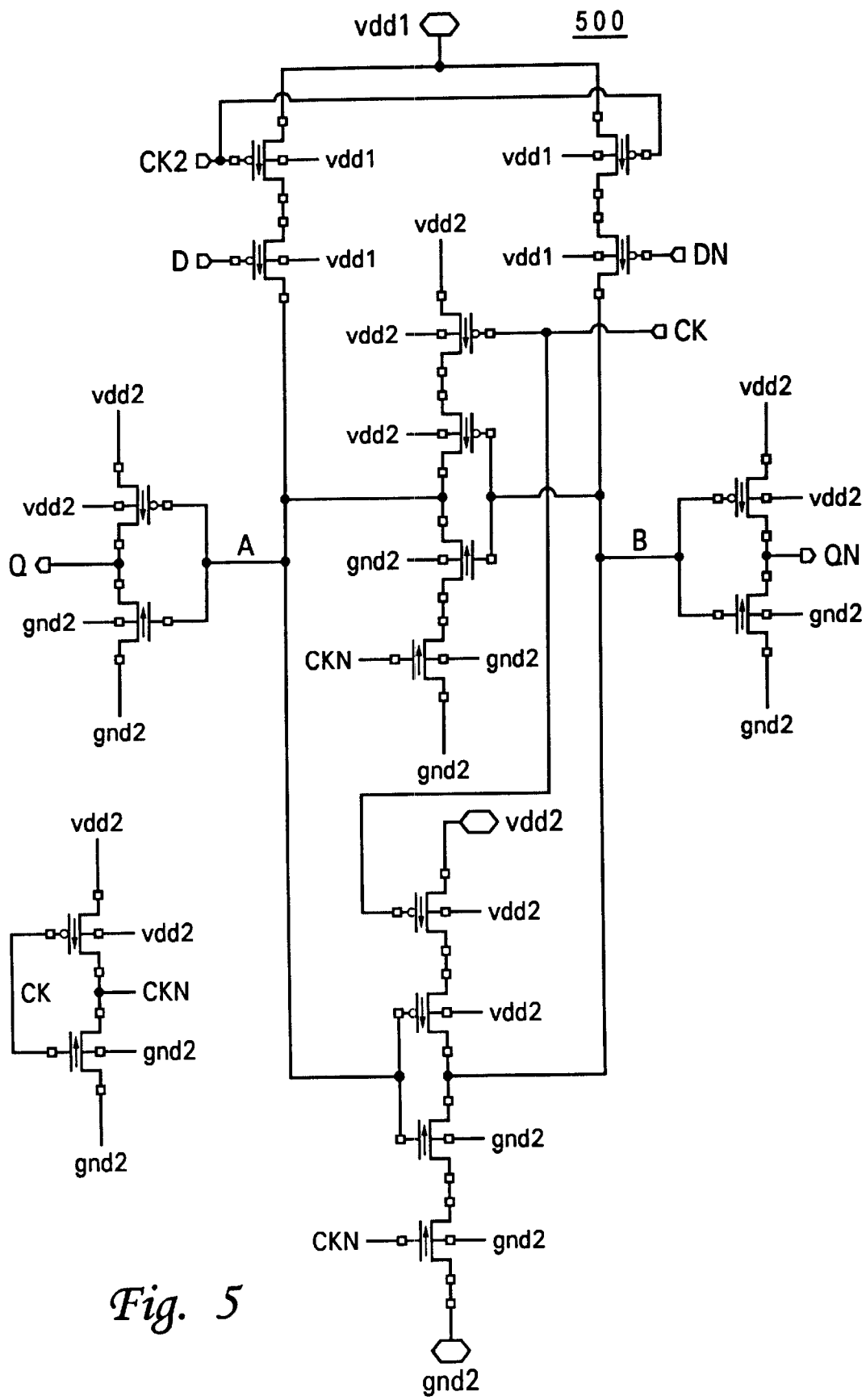
FIG. 5 illustrates a level shifting latch circuit incorporated within a self-regulating voltage divider in accordance with an alternate embodiment of the present invention.

Referring to FIGS. 3 and 5, there are illustrated two level shifting devices that are applicable within a system similar to DC distribution system 100 in alternative embodiments of the present invention. FIG. 3 depicts a level shifting latch 300 that may be advantageously utilized for providing inter-plane delivery of clock signals or other signals expected to make frequent rail-to-rail transitions. As illustrated in FIG. 3, level shifting latch 300 is connected between a first voltage plane, VDD2 to gnd2, and a second voltage plane, VDD1 to gnd1. Specifically, level shifting latch 300 latches logic signals emitted from the lower voltage plane (VDD2 to gnd2) on the falling edge of a clock signal from a CK input and converts these signals to the upper voltage plane (VDD1 to gnd1).

Figure 4:
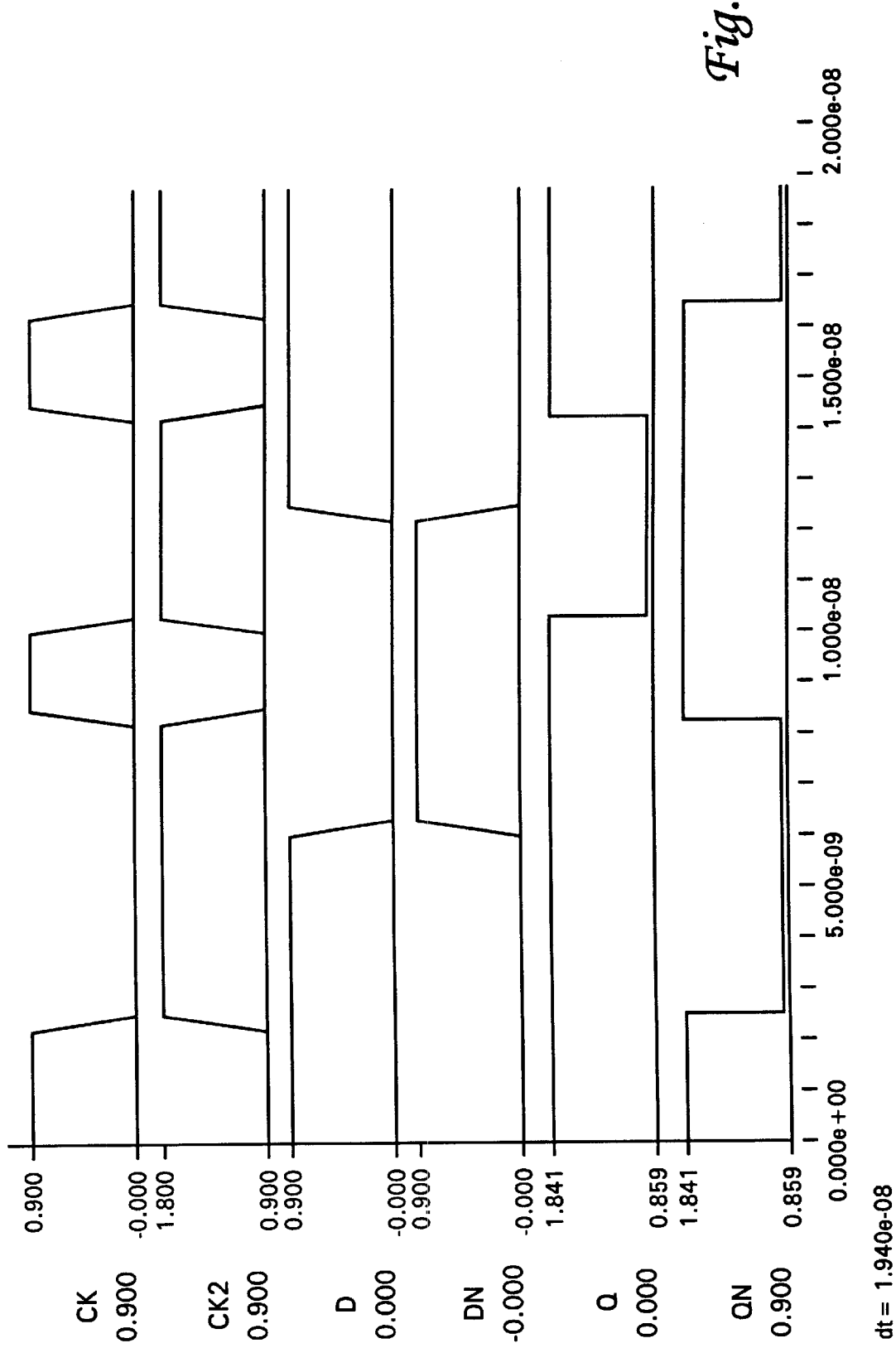
FIG. 4 is a timing diagram depicting the operation of the level shifting latch circuit in FIG. 3.

With reference to FIGS. 3 and 4, level shifting latch 300 operates as follows. When CK is low, N-type field effect transistors (NFETs) N0 and N1 are not conducting, thus disabling NFETs N2 and N3 from passing a pair of logic inputs D and DN from the upper voltage plane into level shifting latch 300. A complementary clock input CK2 is at a logic level high while CK is low, causing P-type field effect transistors (PFETs) P2 and P3 along with NFETs N6 and N7 to be switched on. In this condition (i.e., N0 and N1 off and P2, P3, N6, and N7 on) level shifting latch 300 is configured as a positive feedback inverter memory element that holds the previously set logic state.

When CK rises, CK2 falls resulting in P2, P3, N6, and N7 switching off and N0 and N1 switching on. In this configuration, and depending on the respective logic states of logic inputs D and DN, either a node A or a node B will be pulled to gnd2 voltage level.

When CK subsequently falls to a logic low, CK2 will rise and NFETs N6 and N7 and PFETs P2 and P3 will switch on and the memory element defined by an inverter comprising P2, P1, N5, and N7, and a second inverter comprising P3, P0, N4, and N6, will either transition or remain in the previous logic state depending on the voltage levels residing at nodes A and B.

Figure 6:
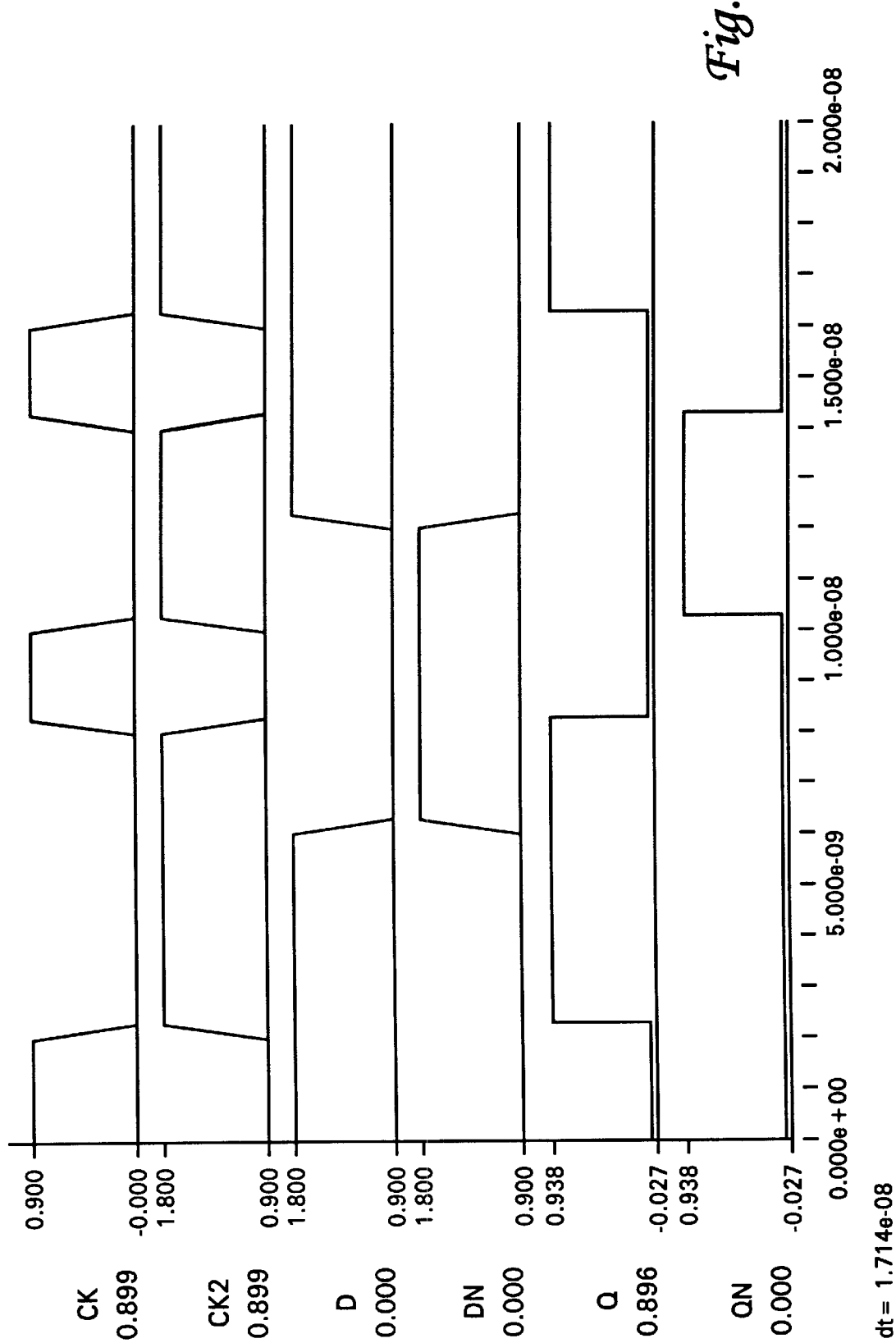
FIG. 6 is a timing diagram depicting the operation of the level shifting latch circuit in FIG. 5.

A complementary logic version of level shifting latch 300 is depicted in FIG. 5 as level shifting latch 500 wherein logic signals emitted from the upper voltage plane (VDD1 to gnd1) are latched and converted to the lower voltage plane (VDD2 to gnd2) on a falling CK clock edge. The operation of level shifting latch 500 is similar in principle to that of level shifting latch 300 except that the polarities and transistor types (N-type or P-type) are reversed where necessary. FIG. 6 is a timing diagram depicting the operation of level shifting latch circuit 500.

Figure 7:
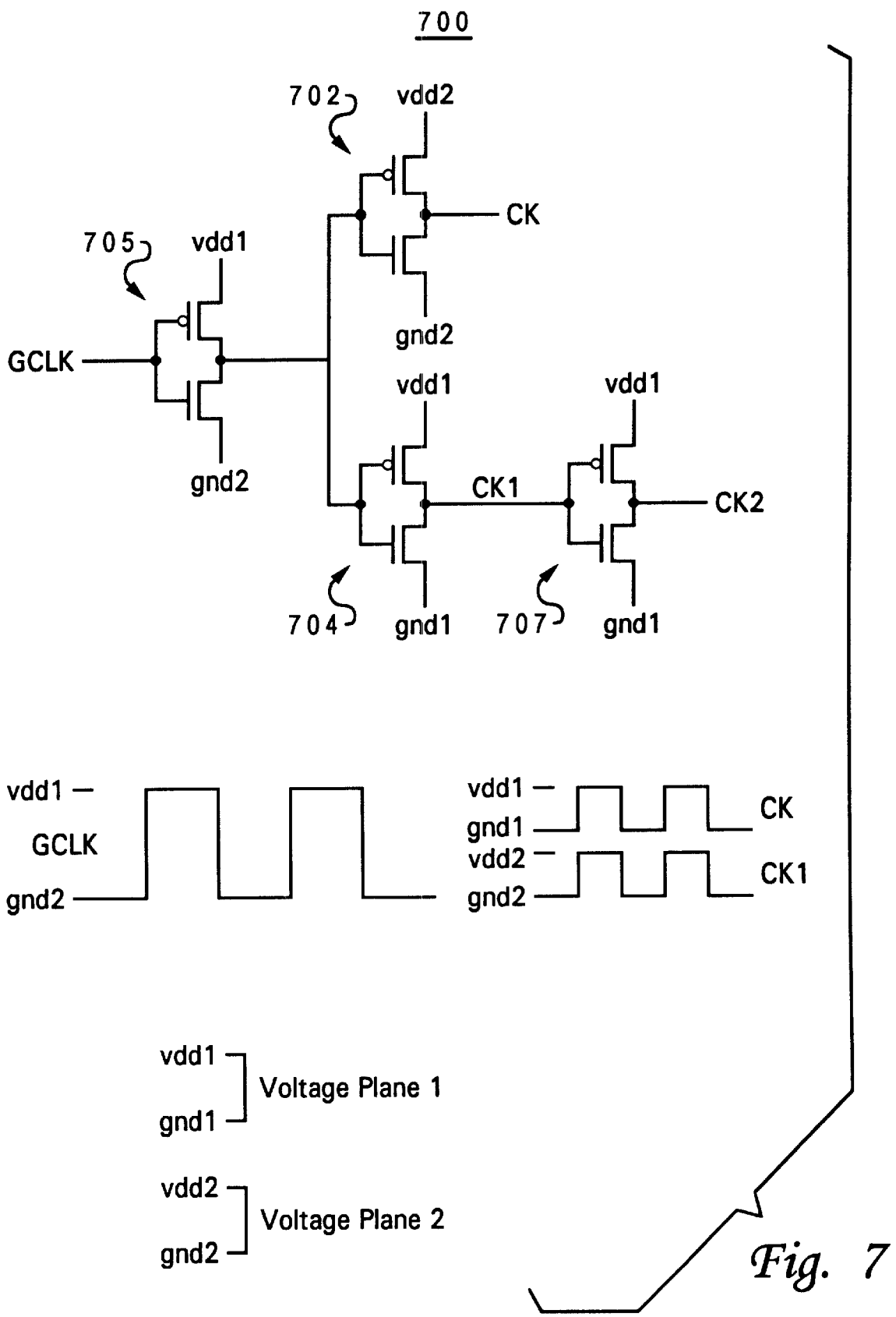
FIG. 7 illustrates a timing circuit utilized to generate synchronous clock signals for a self-regulating voltage divider in accordance with a preferred embodiment of the present invention.

Referring to FIG. 7, there is illustrated a timing circuit 700 utilized to generate synchronous clock signals for a self-regulating voltage divider in accordance with a preferred embodiment of the present invention. As incorporated within DC distribution system 100 in conjunction with level shifting latch 300, timing circuit 700 includes a global clock input, GCLK, which operates at the full swing source-to-ground voltage of 1.8 volts to drive two voltage adjusted inverters 702 and 704.

As depicted in FIG. 7, inverters 702 and 704 receive an inverted GCLK signal at the output of inverter 705. Inverter 704 is coupled between voltage levels VDD1 and gnd1 (corresponding to the upper voltage plane in FIG. 3), which in the depicted embodiment are set to 1.8 volts and 0.9 volts, respectively. Inverter 702 is coupled between voltage levels VDD2 and gnd2 (corresponding to the lower voltage plane in FIG. 3), which in the depicted embodiment are set to 0.9 volts and 0 volts, respectively. Inverter 702 outputs a voltage adjusted output clock signal CK (corresponding to CK in FIG. 3), and inverter 704 in conjunction with another inverter 707 generates voltage adjusted output clock signal CK2 (corresponding to CK2 in FIG. 3), both of which are utilized to drive level shifting latch 300.

Figure 8:
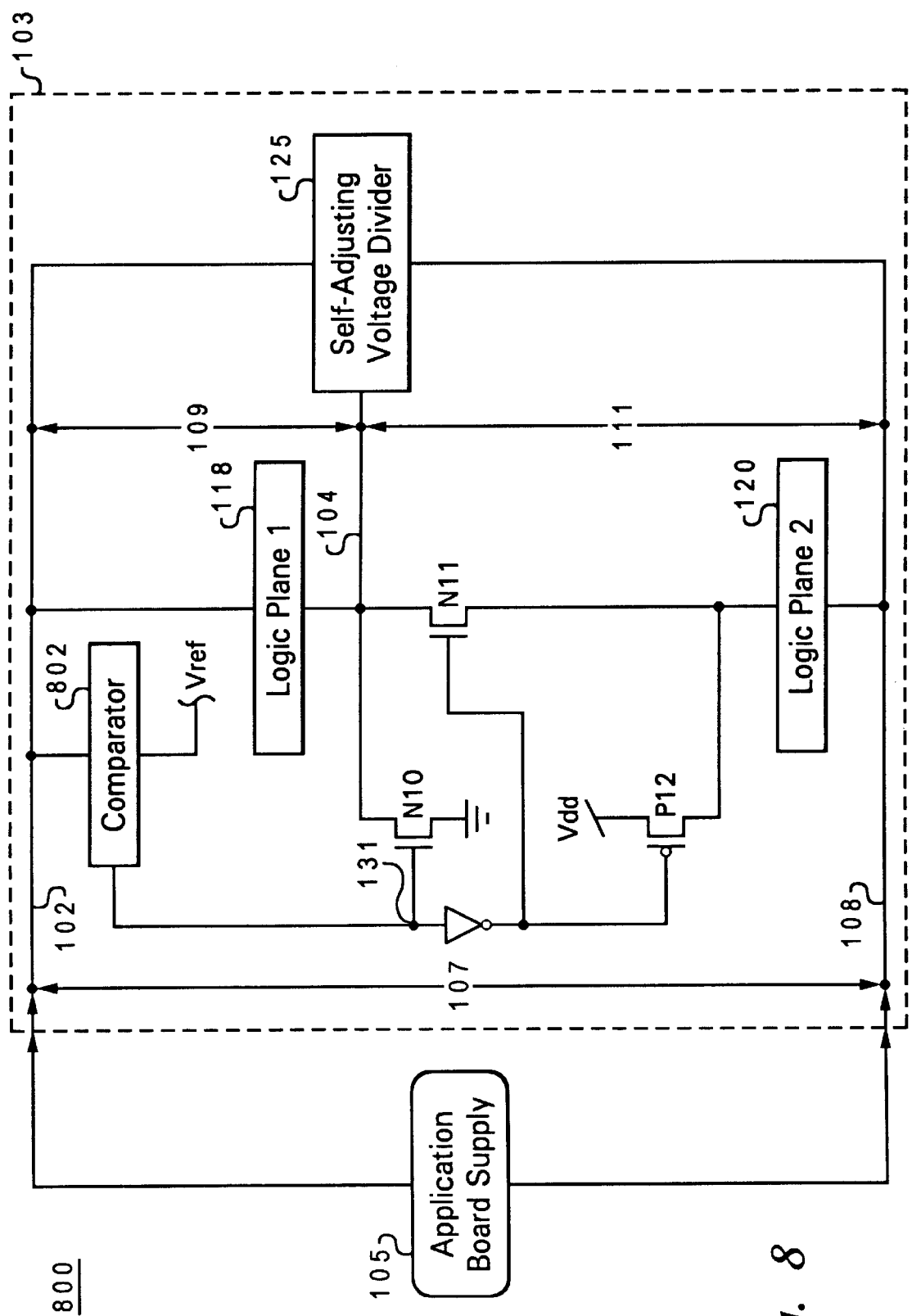
FIG. 8 depicts a supply mode shift circuit employed within a DC distribution system, in accordance with a preferred embodiment of the present invention.

The self-regulating voltage divider of the present invention provides an optimal balance between serially stacked intermediate voltage planes. If, however, the rail-to-rail supply voltage (i.e., the source voltage plane) is diminished due to loading and/or power supply insufficiencies, it may be necessary to dynamically shift from the stacked rail operating mode described above to a single voltage rail mode. FIG. 8 depicts a supply mode shift circuit employed within a serially stacked DC distribution circuit 800 in accordance with a preferred embodiment of the present invention.

In addition to the functionality described with reference to FIGS. 1 and 2, DC distribution circuit 400 includes a supply mode shift circuit comprising a comparator 802, a PFET P12, and a pair of NFETs N10 and N11. The depicted supply mode shift circuit allows serially connected logic sections 118 and 120 to be connected in parallel during periods when the supply voltage $V_{dd}$ at source supply voltage node 102 is not large enough to sustain proper logic operation. The ability to shift from stacked serial operating supply mode to parallel supply mode is particularly useful when the $V_{dd}$ voltage supply is supplied from a battery, and the battery voltage begins to decay.

The operation of the supply mode shift circuit within DC distribution circuit 800 is as follows. Comparator 802 compares the $V_{dd}$ voltage level at source supply node 102 with a reference voltage $V_{ref}$ to produce a serial mode control signal at a mode control node 131. The level of $V_{ref}$ is set to coincide with the minimum voltage level at which serially stacked operations may continue. While the value of $V_{dd}$ remains higher than $V_{ref}$, comparator 802 maintains the serial modal control signal at mode control node 131 de-asserted, resulting in NFET N11 being switched on while NFET N10 and PFET P12 are switched off. In this configuration, intermediate voltage node 104 is maintained as the effective ground for intermediate voltage plane 109.

If the value of $V_{dd}$ reaches $V_{ref}$, comparator 802 asserts the serial mode control signal at mode control node 131, resulting in NFET N10 and PFET P12 being switched on while NFET N11 is switched off. In this configuration, intermediate voltage node 104 is coupled to source supply voltage node 102, resulting in both logic planes operating with the same parallel power supply.

Figure 10:
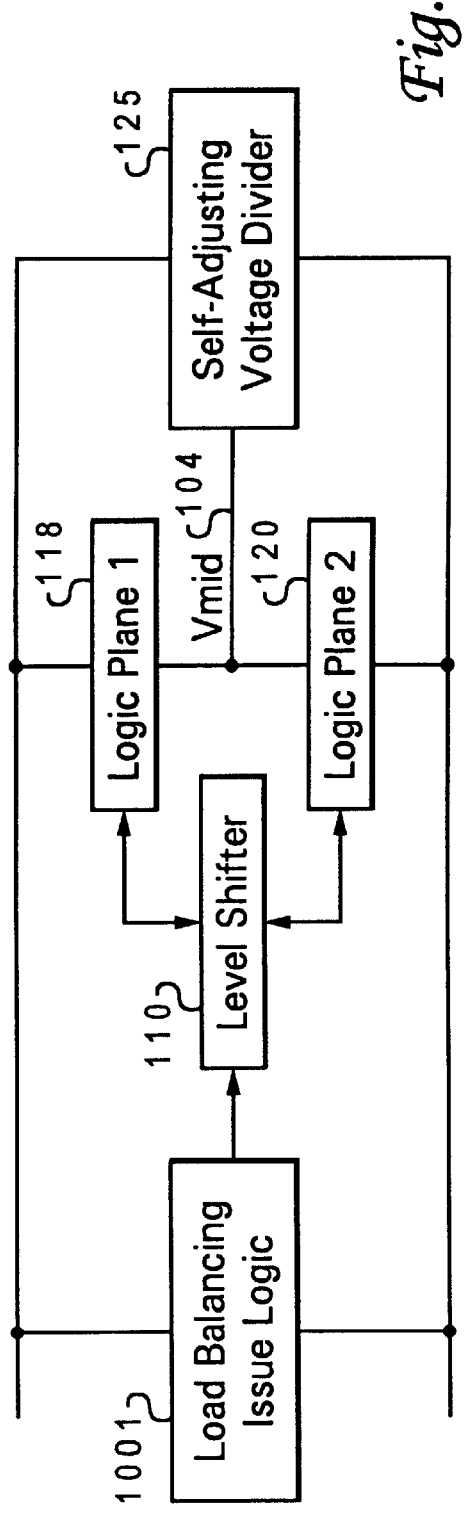
FIG. 10 depicts the system depicted in FIG. 1A with an additional load balancing issue logic unit.

To maintain optimal efficiency of the system, it is desirable to balance the load currents $I_{L1}$ and $I_{L2}$ depicted in FIG. 1B as closely as possible. In complementary metal-oxide semiconductor (CMOS) logic circuits, the active load current is proportional to switching activity. FIG. 10 illustrates the system depicted in FIG. 1A with an additional load balancing issue logic unit 1001, which performs the logic function of sending data or instructions alternately to either logic plane 118 or logic plane 120 such that the current through these planes are balanced.

Figure 11:
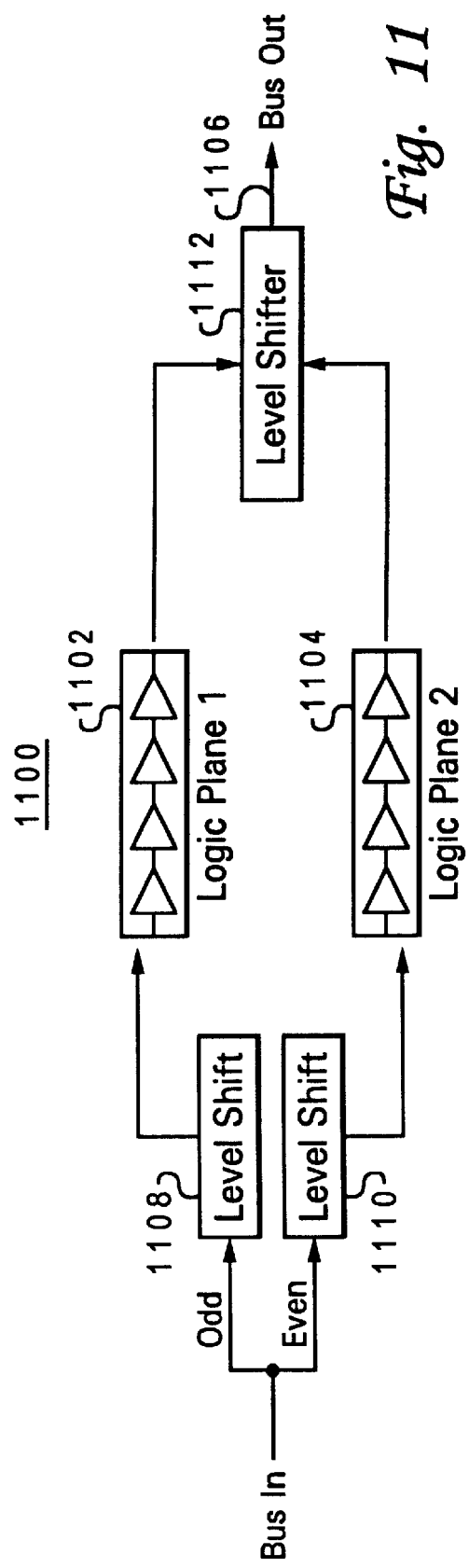
FIG. 11 illustrates a load balance device for a bus distribution system in accordance with a preferred embodiment of the present invention.

With reference now to FIG. 11, there is depicted a load balance device 1100 for a bus distribution system, wherein the circuits in logic plane 118 and logic plane 120 are represented as long bus wires with repeater buffers 1102 and 1104, respectively.

The load balance mechanism for load balance device is a simple wiring network in which odd bits of an incoming bus are distributed through a level shifter 1108 to logic plane 118 and odd bits are distributed through a level shifter 1110 to logic plane 120. At a bus output 1106, both signals are input into an output level shifter 112 and delivered at a bus output 1106 at the full logic level. This system saves power by allowing signal transmission in logic plane 118 and logic plane 120 to occur at one-half the supply voltage, using only the reduced size, self-adjusting voltage divider 125 shown in FIG. 2 to maintain a constant intermediate voltage level $V_{mid}$.

While the invention has been particularly shown and described with reference to a preferred embodiment, it will be understood by those skilled in the art that various changes in form and detail may be made therein without departing from the spirit and scope of the invention.

What is claimed is:

1. A self-regulating voltage divider comprising: a source voltage plane having a source supply node for supplying current and a source ground node for sinking current supplied therefrom;

an intermediate voltage supply node coupled between said source supply voltage node and said source ground node for dividing said source voltage plane into a plurality of intermediate voltage planes; and a first capacitor and a second capacitor that are each controllably coupled between either said source supply voltage node and said intermediate voltage supply node, or between said intermediate voltage supply node and said source ground node, such that a voltage level balance is achieved among said plurality of intermediate voltage planes.

2. The self-regulating voltage divider of claim 1, further comprising switching means for alternately switching said first and second capacitor such that while said first capacitor is coupled between said source supply voltage node and said intermediate voltage supply node, said second capacitor is coupled between said intermediate voltage supply node and said source ground node, and such that when said second capacitor is coupled between said source supply voltage node and said intermediate voltage supply node, said first capacitor is coupled between said intermediate voltage supply node and said source ground node.

3. The self-regulating voltage divider of claim 2, wherein said switching means comprises a plurality of transistors configured to controllably couple said first or second capacitor to said source supply voltage node, or said intermediate voltage supply node, or said source ground node.

4. The self-regulating voltage divider of claim 3, wherein said plurality of transistors are field-effect transistors.

5. The self-regulating voltage divider of claim 4, wherein said plurality of field-effect transistors include:
- a first P-type field-effect transistor source-to-drain coupled between said source supply voltage node and a first side of said first capacitor;
- a first N-type field-effect transistor source-to-drain coupled between a second side of said first capacitor and said source ground node;
- a second P-type field-effect transistor source-to-drain connected between said intermediate voltage supply node and said first side of said first capacitor; and
- a second N-type field-effect transistor source-to-drain connected between said intermediate voltage supply node and said second side of said first capacitor.

6. The self-regulating voltage divider of claim 5, wherein said plurality of field-effect transistors include:
- a third P-type field-effect transistor source-to-drain coupled between said source supply voltage node and a first side of said second capacitor;
- a third N-type field-effect transistor source-to-drain coupled between a second side of said second capacitor and said source ground node;
- a fourth P-type field-effect transistor source-to-drain connected between said intermediate voltage supply node and said first side of said second capacitor; and
- a fourth N-type field-effect transistor source-to-drain connected between said intermediate voltage supply node and said second side of said second capacitor.

7. The self-regulating voltage divider of claim 6, wherein said switching means further comprises:
- a first pulse generator input coupled to the gate terminals of said second and third N-type field-effect transistors;
- an inverted first pulse generator input coupled to the gate terminals of said first and fourth P-type field-effect transistors;
- a second pulse generator input coupled to the gate terminals of said first and fourth N-type field-effect transistors; and
- an inverted second pulse generator input coupled to the gate terminals of said second and third P-type field-effect transistors.

8. A load balancing network utilizing a self-regulating voltage divider for distributing a computational load evenly across each of a plurality of voltage planes, said load balancing network comprising:
- a source voltage plane having a source supply rail for supplying power to an IC chip and a source ground rail for sinking power supplied therefrom;
- at least one intermediate ground rail connected between said source supply rail and said source ground rail for dividing said source voltage plane into a plurality of intermediate voltage planes; and
- a voltage divider coupled to said source supply rail, said source ground rail, and said intermediate ground rail for maintaining a balance among the voltages of said at least one intermediate voltage plane.

9. The load balancing network of claim 8, wherein said at least one intermediate ground rail serves as a supply rail for a subsequent intermediate voltage plane such that said plurality of intermediate voltage planes are series-connected.

10. The load balancing network of claim 8, further comprising a level shifter circuit connected between at least two of said intermediate voltage planes for facilitating inter-plane communication.

11. The load balancing network of claim 10, wherein said level shifter comprises a coupling capacitor for providing DC isolation between said at least two intermediate voltage planes.

12. The load balancing network of claim 11, wherein said level shifter further comprises a damper circuit on the output side of said coupling capacitor for clamping signals to the DC level on the output side of said coupling capacitor.

13. The load balancing network of claim 11, wherein said level shifter further comprises:
- a tri-state inverter on the input side of said coupling capacitor that delivers an incoming signal to said coupling capacitor in response to an asserted control signal;
- a clock for delivering said control signal to said tri-state inverter; and
- a pair of switches for driving both sides of said coupling capacitor to a known voltage level in response to deassertion of said control signal.

14. The load balancing network of claim 11, wherein said level shifter circuit further comprises a latch on the output side of said coupling capacitor for holding a last state.

* * * * *